(12) United States Patent
Reynolds

(10) Patent No.: US 6,791,943 B1
(45) Date of Patent: Sep. 14, 2004

(54) EVENT-BASED TECHNIQUE FOR DETERMINING INSTANTANEOUS CELL BANDWIDTH IN A DIGITAL COMMUNICATIONS NETWORK

(75) Inventor: Scott B. Reynolds, Vancouver (CA)

(73) Assignee: Agilent Technologies, Inc., Palo Alto, CA (US)

( * ) Notice: Subject to any disclaimer, the term of this patent is extended or adjusted under 35 U.S.C. 154(b) by 851 days.

(21) Appl. No.: 09/032,622

(22) Filed: Feb. 27, 1998

(51) Int. Cl.$^7$ .................... G01R 31/08; G06F 11/00; G08C 15/00

(52) U.S. Cl. .................... 370/232; 370/253; 370/395.1

(58) Field of Search .................... 370/229, 230, 370/231, 232, 235, 252, 253, 389, 395, 396, 397, 398, 399, 400

(56) References Cited

U.S. PATENT DOCUMENTS

| | | | | |
|---|---|---|---|---|
| 5,745,477 A | * | 4/1998 | Zheng et al. | 370/230 |
| 5,784,358 A | * | 7/1998 | Smith et al. | 370/230 |
| 5,864,538 A | * | 1/1999 | Chong et al. | 370/235 |
| 5,875,173 A | * | 2/1999 | Ohgane et al. | 370/230 |
| 5,889,779 A | * | 3/1999 | Lincoln | 370/398 |
| 5,898,669 A | * | 4/1999 | Shimony et al. | 370/232 |
| 5,940,375 A | * | 8/1999 | Soumiya et al. | 370/249 |
| 5,991,265 A | * | 11/1999 | Lincoln | 370/229 |
| 6,005,843 A | * | 12/1999 | Kamiya | 370/231 |
| 6,094,418 A | * | 7/2000 | Soumiya et al. | 370/231 |

OTHER PUBLICATIONS

Fang Lu, "Recent Advances in Networking", Aug. 21, 1995, from ATM Congestion downloaded from the Internet URL http://www.cis.ohio-state.edu/~jain/cis788/atm_cong/index.html.

ATM Bibliography downloaded from the Internet URL http://nebo.cs.byu.edu/~walthalr/congestion.html.

* cited by examiner

Primary Examiner—Bob A. Phunkulh

(57) ABSTRACT

A method and associated apparatus for determining the bandwidth or transmission rate of a desired type of cell in a cell stream occurring over a digital communications network connection during a time interval between occurrences of a first and second predetermined event. The transmission rate of the desired cell, such as an Asynchronous Transfer Mode (ATM) Available Bit Rate (ABR) user cell may be measured only when certain conditions exist, eliminating unnecessary calculations from being performed. Furthermore, the cell bandwidth may be determined immediately upon occurrence of the predetermined events, providing real-time feedback and analysis to test and measurement and/or network nodes. In an ATM ABR environment, for example, this enables the implementing system to immediately compare the actual cell transmission rate calculated in accordance with the present invention to the rate at which the cell stream was transmitted by a source node, as identified by a resource management (RM) control cell in the cell stream. Such information may then be immediately provided to the virtual or actual source nodes in the network in a backward-going RM cell for subsequent use in determining the transmission rate of a future cell stream. One implementation is in an event-based cell bandwidth determinator for determining a transmission rate of a first type of cell in a cell stream occurring over a digital communications network connection during a time interval between an occurrence of first and second events, such as successive occurrence of a second type available bit rate ABR cell stream. Here, the first type of cell is a user cell and the second type of cell is a resource management (RM) cell. The connection may be one or more virtual channels or paths in the ATM network.

20 Claims, 9 Drawing Sheets

FIG. 6

| PACKET LONG WORD | BYTE 0 (TRANSMITTED FIRST) | BYTE 1 | BYTE 2 | BYTE 3 |
|---|---|---|---|---|
| 0 | cell_byte(1) | cell_byte(2) | SPARE(7:3), EFCI, match(1:0) | VC_SEL(7:4), VC_SEL(3:0) |
| 1 | cell_byte(3) | cell_byte(4) | cell_byte(5) | cell_type(3:0) / OAM_type(7:4) |
| 2 | cell_byte(6) | cell_byte(7) | cell_byte(8) | cell_byte(9) |
| 3 | cell_byte(10) | cell_byte(11) | cell_byte(12) | cell_byte(13) |
| 4 | cell_byte(14) | cell_byte(15) | cell_byte(16) | cell_byte(17) |
| 5 | cell_byte(18) | cell_byte(19) | cell_byte(20) | cell_byte(21) |
| 6 | cell_byte(22) | cell_byte(23) | cell_byte(24) | cell_byte(25) |
| 7 | cell_byte(26) | cell_byte(27) | cell_byte(28) | cell_byte(29) |
| 8 | cell_byte(30) | cell_byte(31) | cell_byte(32) | cell_byte(33) |
| 9 | cell_byte(34) | cell_byte(35) | cell_byte(36) | cell_byte(37) |
| 10 | cell_byte(38) | cell_byte(39) | cell_byte(40) | cell_byte(41) |
| 11 | cell_byte(42) | cell_byte(43) | cell_byte(44) | cell_byte(45) |
| 12 | cell_byte(46) | cell_byte(47) | cell_byte(48) | cell_byte(49) |
| 13 | cell_byte(50) | cell_byte(51) | cell_byte(52) | cell_byte(53) |
| 14 | timestamp(31:16) | | timestamp(15:0) | |
| 15 | $UCC_{0+1}(15:0)$ | | CRC10E(15:0) | |
| 16 | SPARE(15:0) | | SPARE(15:0) | |

PACKET FORMAT 600

FIG. 7A

CODING OF CELL_TYPE FIELD 604

| | CELL DESCRIPTION | cell_type(3) F5 bit 7 | cell_type(2) RM bit 6 | cell_type(1) F4/F5_OAM bit 5 | cell_type(0) Flow_type bit 4 |
|---|---|---|---|---|---|
| | F1-F3 LAYER ONLY (INCLUDES IDLE AND UNASSIGNED) | 0 | 0 | 0 | 0 |
| 703 | F4 OTHER NON-USER (INCLUDES VP RESERVED) | 0 | 0 | 0 | 1 |
| | F4 END-TO-END OAM | 0 | 0 | 1 | 0 |
| | F4 SEGMENT OAM | 0 | 0 | 1 | 1 |
| | F4 RESOURCE MANAGEMENT | 0 | 1 | 0 | 0 |
| | RESERVED | 0 | 1 | 0 | 1 |
| | RESERVED | 0 | 1 | 1 | 0 |
| 702 | RESERVED | 0 | 1 | 1 | 1 |
| 701 | F5 USER CELL | 1 | 0 | 0 | 0 |
| 704 | F5 OTHER NON-USER | 1 | 0 | 0 | 1 |
| | F5 END-TO-END OAM | 1 | 0 | 1 | 0 |
| | F5 SEGMENT OAM | 1 | 0 | 1 | 1 |
| | F5 RESOURCE MANAGEMENT | 1 | 1 | 0 | 0 |
| | RESERVED | 1 | 1 | 0 | 1 |
| | RESERVED | 1 | 1 | 1 | 0 |
| | RESERVED | 1 | 1 | 1 | 1 |

FIG. 7B

CODING OF OAM_TYPE FIELD 608

| OAM CELL DESCRIPTION | OAM_type(3:0) |
|---|---|
| NOT AN F4 OR F5 LAYER OAM/RM CELL | 0000 |
| EDC ERRORED | 0001 |
| ILLEGAL OAM/RM TYPE/FUNCTION DECODE | 0010 |
| AIS | 0011 |
| RDI | 0100 |
| CONTINUITY CHECK | 0101 |
| LOOPBACK RESPONSE | 0110 |
| LOOPBACK REQUEST | 0111 |
| FORWARD MONITORING PM | 1000 |
| BACKWARD REPORTING PM | 1001 |
| ACTIVATION/DEACTIVATION REQUEST | 1010 |
| ACTIVATION/DEACTIVATION RESPONSE | 1011 |
| SYSTEM MANAGEMENT | 1100 |
| ABR RESOURCE MANAGEMENT | 1101 |
| ABT/RESOURCE MANAGEMENT | 1110 |
| RESERVED ABT/IT | 1111 |

FIG. 8

RM-EVENT RECORD FORMAT

| PACKET LONG WORD | BYTE 0 (TRANSMITTED FIRST) | BYTE 1 | BYTE 2 | BYTE 3 |
|---|---|---|---|---|
| 0 | TAG(7:4) SPARE(3:0) | RM-event(7:3) UC_EFCI, SPARE(1:0) | ER(15:0) | |
| 1 | CCR(15:0) | | MCR(15:0) | |
| 2 | QL(31:0) | | | |
| 3 | SN(31:0) | | | |
| 4 | TIMESTAMP(31:0) | | | |
| 5 | $UCC_{0+1}$(15:0) | | CRC10E(15:0) | |

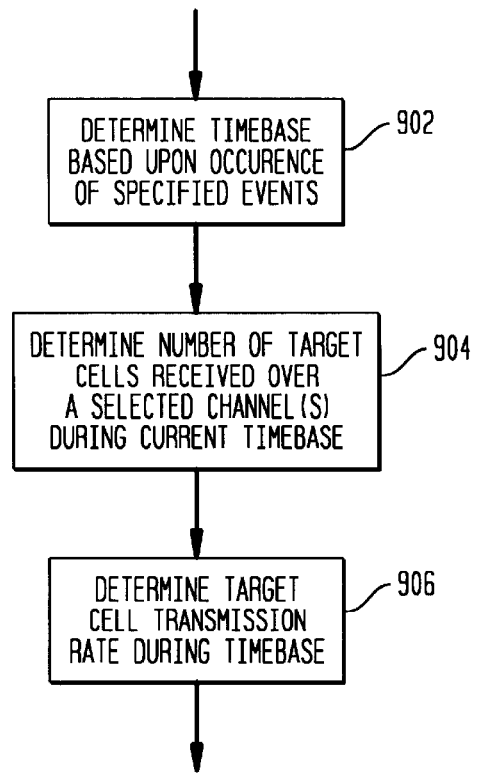

902 — DETERMINE TIMEBASE BASED UPON OCCURENCE OF SPECIFIED EVENTS

904 — DETERMINE NUMBER OF TARGET CELLS RECEIVED OVER A SELECTED CHANNEL(S) DURING CURRENT TIMEBASE

906 — DETERMINE TARGET CELL TRANSMISSION RATE DURING TIMEBASE

EVENT-BASED TECHNIQUE FOR DETERMINING INSTANTANEOUS CELL BANDWIDTH IN A DIGITAL COMMUNICATIONS NETWORK

BACKGROUND OF THE INVENTION

1. Field of the Invention

The present invention relates generally to digital communications and, more particularly, to estimating cell bandwidth in digital communications networks.

2. Discussion of Related Art

Integrated Services Digital Network (ISDN) systems have been evolving for the past several decades. Since its inception, ISDN has provided a wide variety of services, including voice and data services, with bit rates of up to 64 Kbps, integrated within a single network. For voice communications and many text and data applications, the 64 Kbps ISDN rate has been found to be sufficient. However, there are increasing demands for broadband communications with substantially higher bit rates, such as high-speed data communications, video and high resolution graphics communications. A second generation of ISDN, referred to as Broadband ISDN (B-ISDN), has developed to support these latter types of communications while continuing to provide the same advantages as the first generation ISDN.

The first generation ISDN utilizes a synchronous transfer mode wherein, for the duration of a connection, a synchronous channel with a constant bit rate (CBR) is allocated to that connection. Although suitable for certain applications, synchronous transfer mode generally is unsuitable for integration of service types that have bit rate requirements above 2 Mbs. This inadequacy resulted in the development of the Asynchronous Transfer Mode (ATM) protocol as a preferred method for transferring information in a B-ISDN system. In ATM networks, a user's data is partitioned into fixed-length cells consisting of a 5 byte header and a 48 byte payload. The use of short, fixed-length cells while transmitting only the necessary number of cells per unit time provides the flexibility needed to support variable transmission rates, making ATM particularly suited for integrated traffic consisting of, for example, voice, data and video.

An ATM network is connection-oriented. A Virtual Channel Connection (VCC) is established between a source and destination node before information is transmitted. The VCC traverses one or more intermediate nodes in the communications network. The VCC includes one or more virtual paths (VPs) and virtual channels (VCs). During transmission, an ATM cell stream is switched among VCs and VPs by the intermediate network elements. VP and VC Identifier (VPI/VCI) values included in the cell header are set when the VCC is first established, and altered as the cell stream passes through each switch in the network to identify the next selected virtual path and virtual channel of the VCC. Because of the connection-oriented nature of ATM and the distribution of cell transfer control across the nodes of a virtual channel connection, each network element or node in a virtual path operates as a source and destination of a virtual path, and is generally referred to as an ATM source and ATM destination, depending upon the operations it is performing. For ease of discussion, the source node and any intermediate ATM source are generally referred to herein as an ATM source. Likewise, the destination node and any intermediate ATM destination are generally referred to herein as an ATM destination or ATM destination node.

Each switch in an ATM network has limited resources with which to service large groups of individual network nodes. That is, although the capabilities of ATM switches are increasing rapidly, each switch nevertheless has a limited bandwidth and limited buffer space. With the advent of optical transmission systems such as Synchronous Optical Network (SONET) and an ever increasing number of communicating nodes, these limits often are exceeded. As a result, congestion at the switches occurs quite rapidly. If left unchecked, such congestion can result in buffer overflow and cell loss.

When a VCC is established between a source and destination node, a set of parameters are negotiated, primarily based upon the current bandwidth availability of the network. These parameters, commonly referred to as source-control parameters, are intended to discipline the behavior of the source node so as to avoid congestion on the network. For example, the source node may be provided maximum values for the rate at which it may transmit data instantaneously (Peak Cell Rate or PCR); the average rate over an extended time interval that it may transmit cells (Sustained Cell Rate or SCR); and the burst size that may be sent at the peak rate (Burst Tolerance or BT).

The source node is expected to operate within the limits defined by these negotiated parameters to prevent unexpected traffic from occurring on the network. The presence of unexpected network traffic could cause the network to become congested which, as noted, may cause ATM cells to be lost. It therefore has been established as a protocol violation for a source node to exceed one or more of these negotiated source-control parameters.

Recently, the ATM forum has established a traffic class referred to as the Available Bit rate (ABR) traffic category. ABR is a complex B-ISDN protocol, consisting of a one-directional information flow and a bi-directional control flow. Specifically, a bi-directional VCC is established between a source and destination node. Forward-going ATM (source-to-destination), and a backward-going ATM (destination-to-source) cell streams are established over this VCC. According to an established ABR protocol, specialized control cells called Resource Management (RM) cells are periodically inserted into the forward-going ATM stream and the backward-going ATM stream. The RM cells are generated by the source and destination nodes and, if necessary, modified by the intermediate nodes.

The RM cells inserted into the forward-going stream by the source node contain transmission-related information, including the rate that the source node is currently transmitting cells. To avoid loss of data and to generally maintain the efficiency of the network, the actual transmission rate through all of the virtual paths in a virtual channel connection should be identical to the source transmission rate indicated in the forward-going RM cells. If an ATM source transmits at a rate other than the rate that is indicated in its forward-going RM cells, additional, unexpected traffic may occur. As noted, the extra traffic from a source node can cause the network to become congested, and ATM cells to be lost. It is therefore also a significant protocol violation for these two values not to be the same.

The RM cells inserted into the backward-going ATM stream contain source-control information that instructs the source, node to either decrease or increase its transmission rate, depending on the current state of the network. That is, if additional bandwidth is available on the network, then a backward-going RM cell will indicate to the source that it may increase its transmission rate so as to fully utilize the available bandwidth. Conversely, if the bandwidth of the network is close to or above its maximum capacity, the backward-going RM cells may instruct an ATM source node to decrease its transmission rate so as to avoid cell loss caused by excessive congestion.

The degree by which the source node increases or decreases its transmission rate may be explicitly identified in the backward-going RM-cell. Alternatively, the rate of change is pre-negotiated when a VCC is established so that only a binary indication of whether the source should decrease or increase its transmission rate may be used to provide the above feedback.

Because the consequences of such protocol violations can be so severe, conventional network switches and network test equipment have been developed to monitor the actual rate at which cells are transmitted by a source to identify when the source is operating beyond the negotiated source-control parameters. Traditionally, is source transmission bandwidth has been measured by counting the number of cells received at an ATM virtual destination during sequential fixed periods of time. The number of received cells is divided by the fixed time period to obtain a measurement of cells-per-second (cells/second). By multiplying this value by the number of bits-per-cell (bits/cell), a bandwidth in bits-per-second (bits/second) may be obtained.

However, the bi-directional control provided by the ATM ABR protocol enables the source node and intermediate virtual sources to receive continuous feedback from the network. The transmission rate of these sources in an ABR service can change very rapidly in response to the rate-adjustment instructions contained within the backward-going RM cells. In fact, source-rate changes can occur several times during the single fixed time interval which is typically used in conventional systems to measure cell bandwidth. The source transmission rate indicated in each of the forward-going RM cells transmitted during this fixed time interval, then, would not necessarily match the bandwidth measurement calculated based upon such a time interval. Therefore, conventional techniques cannot determine whether the actual transmission rate through a virtual channel connection is the same as the initial source transmission rate identified in that forward-going RM-cell. As a result, unnecessary protocol violations are raised.

Furthermore, such conventional systems determine the bandwidth at scheduled periodic intervals or during the performance of diagnostic procedures. Such measurements often do not yield the necessary or desired information to diagnose a problem since they are not performed during the occurrence of errors in the network. As a result, the diagnostic process is extended, sometimes considerably.

What is needed, therefore, is a method for measuring the instantaneous cell bandwidth of a digital communications connection. Such a system should be capable of making such measurements when necessary to efficiently obtain the necessary bandwidth information.

SUMMARY OF THE INVENTION

The present invention is a method and associated apparatus for determining the bandwidth or transmission rate of a desired type of cell in a cell stream occurring over a digital communications network connection during a time interval between occurrences of a first and second predetermined event. Advantageously, measurement of the transmission rate of the desired cell, such as an asynchronous transfer mode (ATM) available bit rate (ABR) user cell, during a selected time interval based upon the occurrence of predetermined events provides a flexible and efficient approach for determining cell bandwidth. For example, the cell bandwidth may be measured only when certain conditions exist, eliminating unnecessary calculations from being performed. Furthermore, the cell bandwidth may be determined immediately upon occurrence of the predetermined events, providing real-time feedback and analysis to test and measurement and/or network nodes. In an ATM ABR environment, for example, this enables the implementing system to immediately compare the actual cell transmission rate calculated in accordance with the present invention to the rate at which the cell stream was transmitted by an ATM source node, as identified by a Resource Management (RM) control cell in the ABR cell stream. Such information may then be immediately used to determine the source and effect of errors and/or provided to the source nodes in the network in a backward-going RM cell for subsequent use in determining the transmission rate of a future cell stream.

In one aspect of the invention, an event-based cell bandwidth determinator is disclosed. The determinator is constructed and arranged to determine a transmission rate of a first type of cell in a cell stream occurring over a connection in a digital communications network during a time interval between an occurrence of a first predetermined event and an occurrence of a second predetermined event. In one embodiment, the first and second predetermined events are successive occurrences of a second type cell occurring in the cell stream. In this embodiment, the first type of cells occur in the cell stream between the first and second occurrences of the second type of cells. In one implementation, the cell stream is an ATM ABR cell stream. Here, the first type of cell is an a user cell and the second type of cell is an RM cell. The connection may be one or more channels or paths in the digital network.

Specifically, the determinator includes a timestamper adapted to be coupled to the digital communications network so as to receive the cell stream. The timestamper records a first time at which the first predetermined event occurs and a second time subsequent to the first time at which the second predetermined event occurs. These first and second times define the time interval during which the transmission rate is determined. The determinator also includes a cell counter configured to receive the cell stream and to count a number of the first type of cells occurring in the cell stream during the time interval. A rate calculator coupled to the timestamper and cell counter is also included. The rate calculator is configured to divide the number of the first type of cells by the time interval to generate the transmission rate of the first type of cells.

More specifically, in one embodiment, the first predetermined event is a receipt of a second type of cell in the cell stream and the second predetermined event is a next successive receipt of the second type of cell in the cell stream. In this embodiment, the timestamper includes a timestamp circuit that determines a time of the receipt of each of the second type of cells in the cell stream. The timestamper also includes a packetizer circuit, coupled to the timestamp circuit, that encompasses each of the first and second type of cells into a packet and stores in a first field of each packet the time of receipt of the first and second type of cells encompassed within the packet. Furthermore, the cell counter may include a cell identifier circuit configured to identify he first and second types of cells contained in each packet in accordance with an implemented communications protocol, and to store a value indicating the type of the cells in a second predetermined field of the packet. A channel selector circuit is preferably included in the cell counter to select the packets containing cells for the connection. In this embodiment, a cell stream processor counts the number of first type of cells that occur during the time interval and stores the number of first type of cells in a third predetermined field in the packet encapsulating the later occurrence of the second type of cell. In this embodiment, the user cell counter preferably further includes a packet filter circuit coupled to the user cell stream processor, that forwards only packets containing the second type of cell to the rate calculator.

In another aspect of the invention an apparatus for determining a transmission rate of a first type of cell transmitted in a cell stream over a connection in an ATM network during an event-based adaptive time period is disclosed. The apparatus includes a processor and a memory coupled to the processor. The memory includes a plurality of instructions stored therein which, when executed by the processor, cause the processor to calculate an actual transmission rate of the first type of ATM cells. The transmission rate is based upon a number of the first type of ATM cells received from the connection on the network during a time period between an occurrence of a first and second predetermined event. In one embodiment, the first and second predetermined events are receipt times of two ATM cells of a second type, and the time period between an occurrence of the first and second predetermined events is a time period between the receipt times of the second type of cells. The apparatus may be implemented in any device coupled to the communications network, such as a protocol testing device or a telecommunications switch.

In one particular implementation of this embodiment, the apparatus also includes a cell bus interface device. The cell bus interface has a timestamper configured to identify receipt times of at least the second type of ATM cells received from the network connection. The cell bus interface also includes a cell counter, configured to count the number of first type of ATM cells received over the network connection during the time period between the receipt times of the second type of ATM cells. The cell bus interface may be embodied in hardware, software, or firmware. Preferably, the cell bus interface is embodied in one or more programmable gate arrays or an application specific integrated circuit (ASIC). In the environment wherein the ATM cell stream is transmitted in accordance with an ATM ABR protocol, the second type of ATM cells may be ABR RM cells while the first type of ATM cells may be ABR user cells.

In yet another aspect of the invention, a method for determining a transmission rate of a first type of cell transmitted in a cell stream over an asynchronous transfer mode (ATM) network connection during an event-based adaptive time period is disclosed. The method includes the steps of: a) sensing the occurrence of a first predetermined event; b) sensing the occurrence of a second predetermined event; c) measuring a time period between the occurrences of the first and second events; d) counting a number of cells received from the network connection during the time period; and e) calculating an actual transmission rate of the cells during the time period. Preferably, step e) includes the step of 1) dividing the number of cells counted at the step d) by the time period measured at the step c). The method may be performed by a protocol testing device, network analyzer or other monitoring device coupled to the network, as well as a network switch or other node on the network.

Generally, the method may also include one or more of the steps of f) determining, prior to step a), the first predetermined event upon which the transmission rate is to be measured; or g) determining, prior to step c), the second predetermined event upon which the transmission rate measurement is to complete.

Further features and advantages of the present invention as well as the structure and operation of various embodiments of the present invention are described in detail below with reference to the accompanying drawings. In the drawings, like reference numerals indicate like or functionally similar elements or method steps. Additionally, the left-most one or two digits of a reference numeral identifies the drawing in which the reference numeral first appears.

BRIEF DESCRIPTION OF THE DRAWINGS

The above and further advantages of the invention will be more clearly appreciated from the following detailed description when taken in conjunction with the accompanying drawings, in which:

FIG. 6 is a table illustrating the format of the packets created by one embodiment of the cell bandwidth determinator to encapsulate ATM cells and transfer information between components of the cell bandwidth determinator;

FIG. 7A is a table illustrating the coding of a cell type field in packets having the format illustrated in FIG. 6;

FIG. 7B is a table illustrating the coding of an operations and maintenance (OAM) type field in packets having the format illustrated in FIG. 6;

FIG. 8 is a table illustrating a format of an RM event record constituting an RM cell packet stream generated by the user cell counter of the cell bandwidth determinator; and FIG. 9 is a flowchart of one embodiment of the process performed by the cell bandwidth determinator.

DETAILED DESCRIPTION

Figure 1:
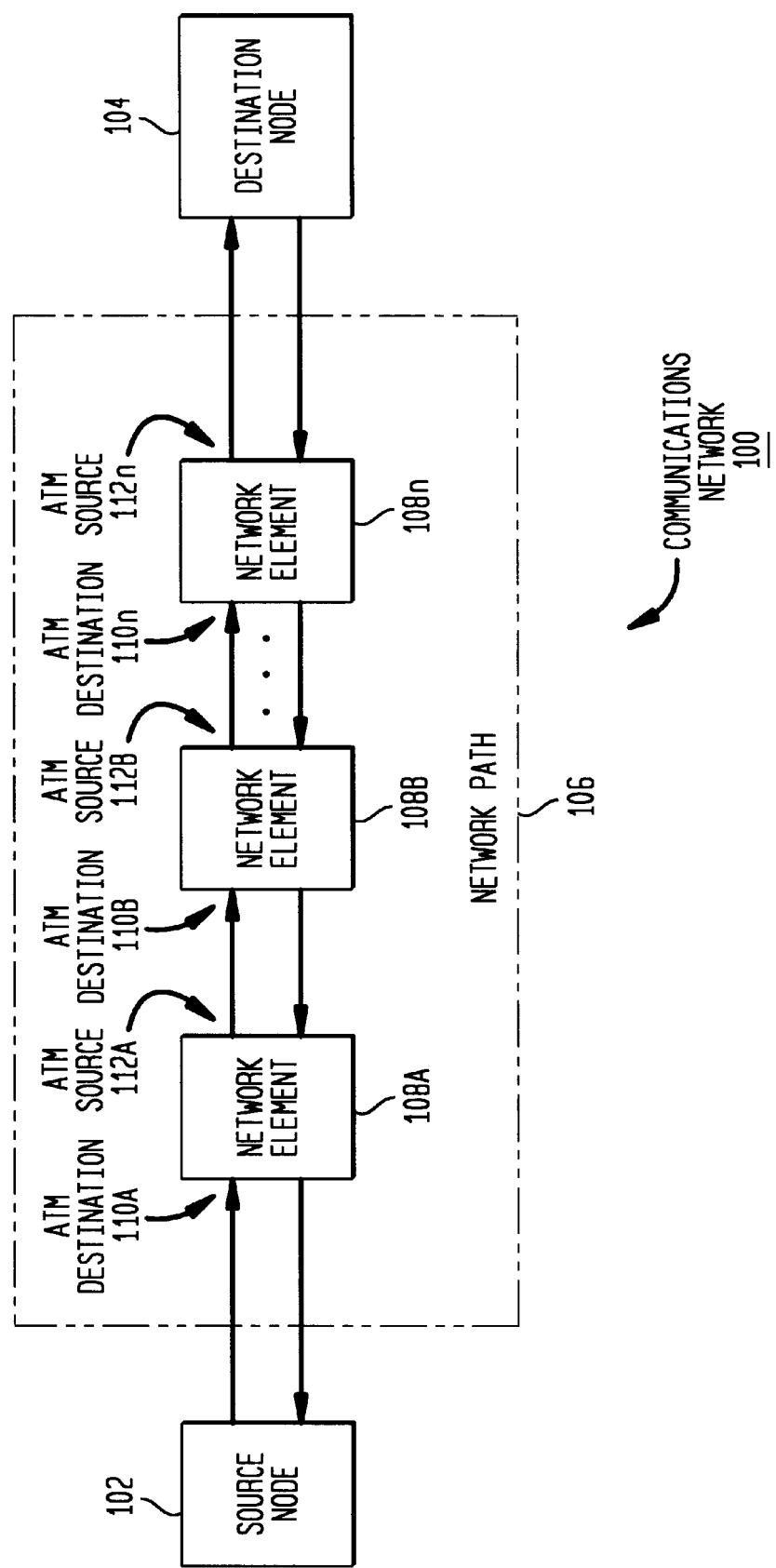
FIG. 1 is a block diagram of an exemplary B-ISDN network environment suitable for implementing an ABR service category.

FIG. 1 is a block diagram of a portion of an exemplary B-ISDN network providing an exemplary data communications environment in which the present invention may be implemented. Communications network 100 includes a transmission source node 102 and a transmission destination node 104 communicably coupled through a network path 106. Many other network paths not shown may exist in network 100. Network path 106 includes network switching/routing elements 108A–108N (collectively and generally referred to as network elements 108). The network path 106 is shown as it might appear after a Virtual Channel Connection (VCC) has been established between the source node 102 and the destination node 104 through multiple network elements 108. As noted, logical connections in ATM are referred to as VCCs. A VCC is established between the source node 102 and the destination node 104 of network 106, and a variable-rate, full-duplex flow of fixed-size cells is exchanged between the source and destination nodes over the established connection. As shown, each network element 108 operates as a destination node, referred to as an ATM destination as it receives ATM cells, and as a source node, referred to as an ATM source as it re-transmits previously received cells.

Figure 2:
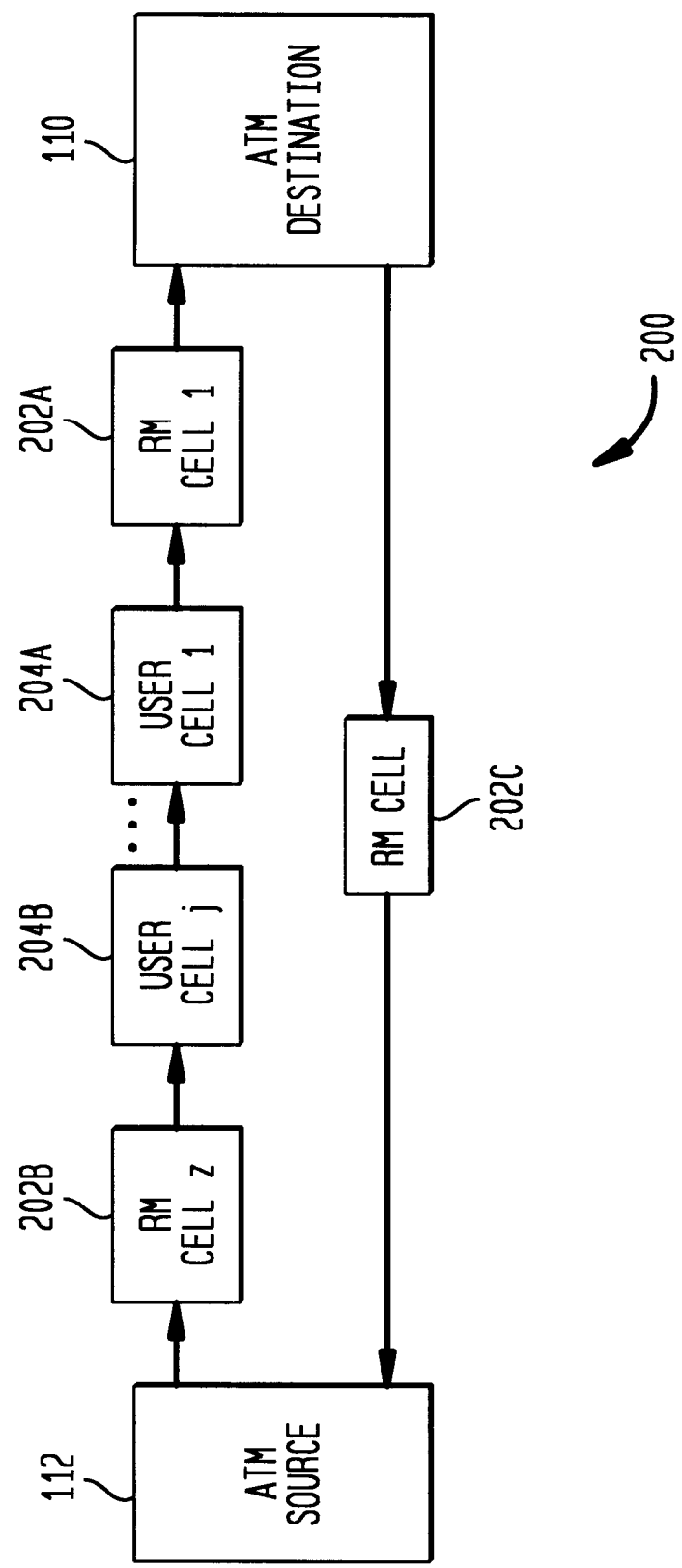
FIG. 2 is a block diagram illustrating ATM cell flow using an ABR protocol which may occur between an ATM source and an ATM destination.

FIG. 2 is a block diagram of an exemplary ATM cell flow 200 which may occur between an ATM source 112 and an ATM destination 110 of successive network elements 108 in the network path 106shown in FIG. 1. In the chosen embodiment, the cell flow 200 is generated in accordance with the ATM available bit rate (ABR) service. Specifically, FIG. 2 shows the transmission relationship between Resource Management (RM) cells 202 and user cells 204 in an ABR cell stream 200 which flows between the ATM source 112 and the ATM destination 110. As shown, ATM source 112 periodically transmits forward-going RM cells 202A and 202B to the ATM destination 110. The ATM source 112 also transmits a stream of user cells 1 through j, where "j" is an integer indicating the number of user-cells 204 transmitted between successive forward-going RM cells 202. In accordance with the ATM ABR protocol, the ATM source 112 is programmable to transmit a desired number of user cells 204 between successive RM cells 202 over the selected virtual communications channel. This VCC is identified in the 5 byte header in each of the cells 202, 204. It should be understood that the RM cells 202 and the user cells 204 are not received in a contiguous manner. The cells may be interspersed among ATM cells from numerous other B-ISDN ATM virtual channels which are simultaneously using a common portion of the network path 106. Furthermore, the source node 102 may transmit each cell in a cell stream asynchronously, and cells may be lost during transmission. Accordingly, cells in a particular communications channel do not necessarily immediately follow other cells from that same channel in the stream.

The user cells 204 are transmitted serially from the ATM source node 102 to the ATM destination 110A of network element 108A, and then are passed from each ATM source 112 to the next ATM destination 110 in the network path 106 until the user cells 204 reach the destination node 104. The RM cells 202 are inserted into the stream of user cells 204 transmitted by the source node 102 as necessary to provide control information in the forward direction. The destination node 104 transmits an RM cell 202C for every RM cell 202A, 202B received by the destination node 104. These "backward" RM cells 202C include feedback information provided by the network elements 108 and/or destination node 104 for the source node 102. As is known in the art, network elements 108 may control and access the RM cells 202 in a number of known manners. For example, the network elements 108 may directly insert feedback control information into the RM cells 202 when they pass in the forward or backward direction. The network elements 108 may also indirectly inform the source node 102 regarding the network condition by setting an EFCI (Explicit Forward Congestion Indication) bit in the header of the cells in the forward information flow. This causes the destination node 104 to update the backward reporting RM cells based upon this congestion information. Accordingly, it should be understood that each network element 108 may generate a backward RM cell 202C as well as modify a backward RM cell 202C received from another ATM destination 110 in the network path 106.

The above discussion regarding the ABR service has been abbreviated so as not to obfuscate the invention. Additional information regarding the content and capabilities of the ABR protocol may be found in a document published by the ATM Forum Technical Committee, entitled *Traffic Management Specification Version* 4.0 document number "af-tm-0056.000," dated April 1996, which is incorporated herein by reference in its entirety. Additionally, a detailed discussion of ATM ABR traffic management from a source-behavior viewpoint can be found in an article by Jain, Raj, et al., *Source Behavior for ATM ABR Traffic Management: An Explanation*, ATM Forum Document Number: ATM Forum/96-1270, available from the ATM Forum, which is also incorporated herein by reference in its entirety.

The present invention includes a cell bandwidth determinator that determines the bandwidth of a specified type of cell during a time interval defined by the occurrence of predetermined events. The implementation of a measurement timebase adaptive in both occurrence and duration enables the cell bandwidth determinator to instantaneously measure cell bandwidth at the desired time and under the desired circumstances and conditions that such a determination is required.

The cell bandwidth determinator may be implemented in any type of device which monitors, evaluates, tests or otherwise operates on a digital communications network. For example, the cell bandwidth determinator may be implemented in a bus analyzer, network analyzer, network switch, router or bridge, as well as a protocol testing device. In accordance with one preferred embodiment of the present invention described below, the cell bandwidth determinator is implemented in an ATM protocol testing device. Such a device is designed to be coupled to a communications bus with one or more network switches. The testing device monitors ATM ABR traffic and measures the contents and timing of the network switch response to the emulated traffic.

The cell bandwidth determinator is an event-based device constructed and arranged to determine a bandwidth of a first type of cell in a communications network during an adaptive timebase delineated by the occurrences of predetermined events. In the exemplary implementation, the cell bandwidth determinator instantaneously measures user cell bandwidth in an ATM ABR cell stream occurring in the B-ISDN network shown in FIG. 1. In this embodiment, the adaptive timebase during which the bandwidth is measured is delineated by successive occurrences of the RM cells 202; that is, the time interval between successively received RM cells 202. As will become apparent to one of ordinary skill in the art, the delineating events may be the same or different events, and may be the occurrence or non-occurrence of any conditions, circumstances, performance criteria or status sensed or generated by the implementing device, and/or elements of the communications network that may be detected by the implementing device.

Figure 3:
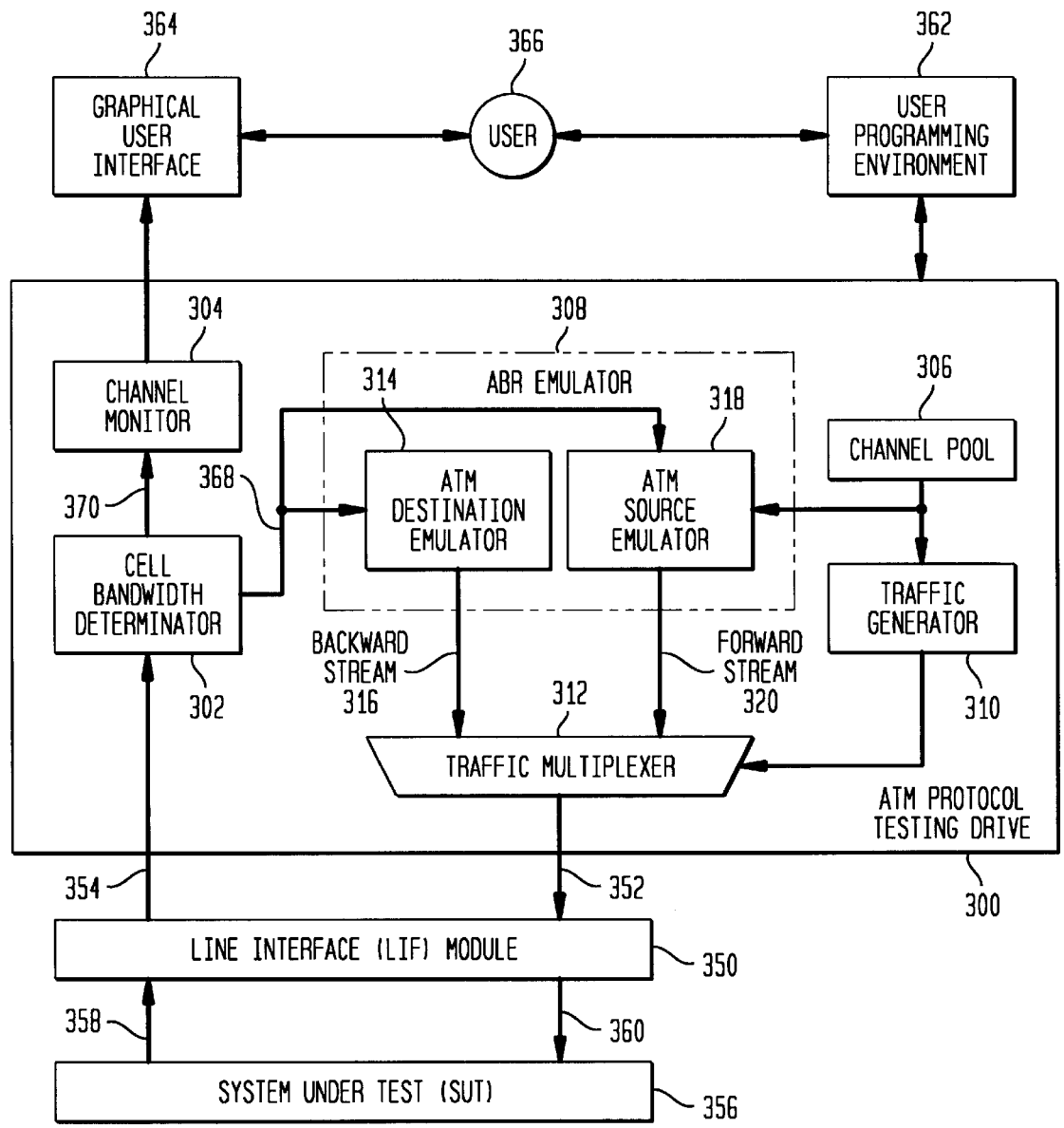
FIG. 3 is a block diagram of one embodiment of an ATM protocol testing device as it may be used in the B-ISDN network illustrated in FIG. 1.

FIG. 3 is an architectural block diagram of one embodiment of an ATM protocol testing device 300 configured in accordance with the present invention to instantaneously measure user cell bandwidth in the B-ISDN network illustrated in FIG. 1. The protocol testing device 300 includes a cell bandwidth determinator 302, channel monitor 304, a channel pool 306, an ABR emulator 308, traffic generator 310, and a traffic multiplexor 312. The ABR emulator 308, in turn, includes an ATM destination emulator 314 and an ATM source emulator 318. As will become apparent to those skilled in the relevant art, these various components may be implemented using hardware, software, firmware or any combination thereof.

The protocol testing device 300 is generally used to analyze and trouble-shoot ATM processing equipment in a network. In the following discussion, the protocol testing device 300 determines the user cell bandwidth in the ATM stream 200 traveling over a virtual channel on the virtual path 106. The cell bandwidth determinator of the present invention may also be used in a network element 108 or source or destination node 102, 104 to determine the user cell bandwidth. The ATM protocol testing device 300 communicates with a line interface module 350 via inter-module cell buses 352 and 354. Line interface module 350 may be any line interface (synchronous or asynchronous) that is suitable for the chosen ATM cell transmission. Line interface module 350, in turn, is connected to a system under test (SUT) 356, such as the B-ISDN network path 106, via buses 358 and 360.

In one preferred embodiment, the ATM protocol testing device 300 is connected to a graphical user interface 364. The graphical user interface 364 permits a user 366 to control and configure the components within the protocol testing device 300. The graphical user interface 364 may also be configured to provide for the display of statistics generated and logged by the ATM protocol testing device 300 as well as protocol violation alarms detected by the testing device 300. Preferably, indications of the operation of the ABR emulator 308 is also presented to the user 366 on the graphical user interface 364.

In another preferred embodiment, a user programming environment 362 is connected to the ATM protocol testing device 300. The user programming environment 362 permits the user 366 to write custom test applications using, for example, the C or C++ programming language, in connection with appropriate libraries in the user programming environment 362. The enables the user to configure, control and analyze the testing device 300 through functions analogous to those available to the user via the graphical user interface 364.

The traffic generator 310 is configured to transmit a user defined sequence of ATM cells from channel pool 306, which maintains a fixed pool of channels containing user-defined sequences of ATM cells. These channels may be allocated, for example, to traffic generation, ABR emulation or statistics gathering. Channels allocated to traffic generation are transmitted as needed to create a desired ATM cell stream.

The ABR emulator 308 emulates ABR ATM cell traffic in accordance with test procedures implemented by the user. The ABR emulator 308 includes an ATM source emulator 318 that transmits a user-defined sequence of ATM cells retrieved from channel pool 306, through traffic multiplexor 312, to inter-module bus 352. A variety of non-conforming behaviors may be simulated by providing user-specified parameters to the source emulator 318. As noted, the transmitted sequence of ATM cells preferably comes from one of the channels of the channel pool 306 that has been allocated for ABR emulation. In addition to transmitting the stream of user-cells, the forward stream generator 320 periodically inserts RM cells 202 into the cell stream 200.

Similarly, the destination emulator 314 implements the behaviors of an ABR destination, generating a user-defined backward stream 316. The destination emulator 314 analyzes the channel-specific forward RM cell flow and, based on user-defined parameters, determines whether to transmit backward RM cells 202C as well as the contents of such RM cells 202C. Together, the ATM source emulator 318 and ATM destination emulator 314 emulate the behavior of an ATM end-station. The traffic multiplexor 312 multiplexes ATM cells from the traffic generator 310 and ABR emulator 308 to the line interface module 352 via the inter-module bus 352 to perform the desired test function.

Figure 4:
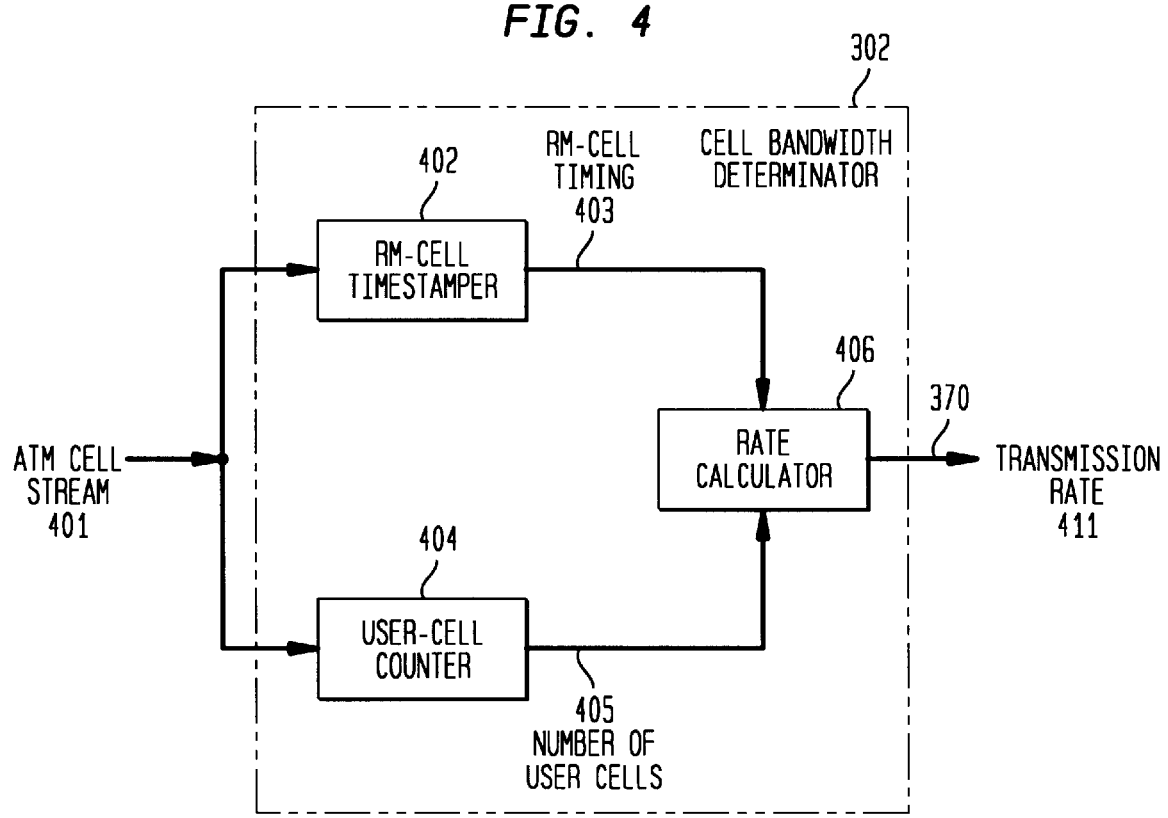
FIG. 4 is a data flow block diagram of the cell bandwidth determinator of the present invention.

FIG. 4 is a data flow block diagram of the cell bandwidth determinator 402 illustrating the primary functional components of the determinator 302 and the flow of data calculated in accordance with the present invention. The cell bandwidth determinator 302 receives a selected ATM cell stream 401.

An RM cell timestamper 402 determines the timebase during which the user cell bandwidth is determined. The RM cell timestamper 402 timestamps or otherwise records the time of receipt of successively-received RM cells 204, the time difference between which defines the timebase for the subsequent bandwidth calculation. In other words, the timebase is adaptive; that is, the occurrence and duration of the timebase are not fixed, but dependent upon some event, here being the receipt of the RM cells 202A, 202B.

A user cell counter 408 counts the number of user cells 204 that are received between the successively received RM cells 202; that is, during the event-based time interval over which the user cell bandwidth is to be determined. The user cell counter 408 provides an output 405 indicating the number of user cells counted during the identified time period.

The RM cell timestamper 406 provides RM cell timing 403 and the user-cell counter 408 provides the number of user cells 204 to a rate calculator 406. The rate calculator 406 determines the transmission rate 411 of the user cells 204 in the ATM cell stream 401 for the selected channel. The rate calculator 406 determines transmission rate 411 based on the RM cell timing 403 and the number of user cells 409 counted during that time interval by the user cell counter 302.

Figure 5:
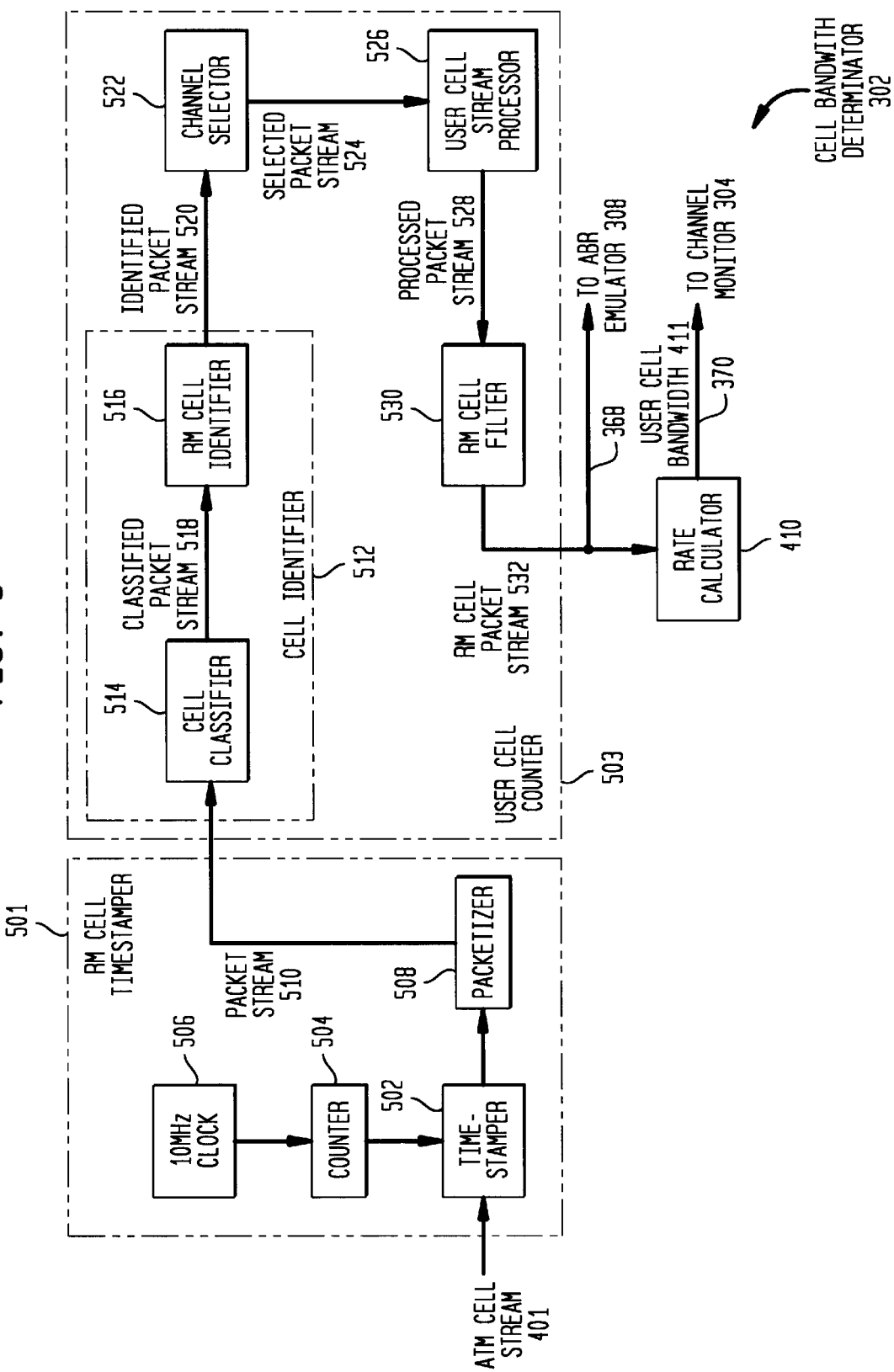
FIG. 5 is a block diagram of an embodiment of the cell bandwidth determinator shown in FIG. 3.

FIG. 5 is an architectural block diagram of one embodiment of the cell bandwidth determinator 402. An RM cell timestamper 501 receives the ATM cell stream 401 and, in this embodiment, packetizes the ATM cells 202 for the subsequent processing described below. In accordance with the present invention, the RM cell timestamper 406 timestamps each of the ATM cells 202 and 204, placing a value indicating the time of receipt in a predetermined field of the packet encapsulating the RM cells. Specifically, an ATM cell stream 401 from inter-module bus 354 is received by a timestamper 502. The timestamper 502 receives a thirty-two bit input from a counter 504, which is cycled by a clock 506. The clock 506 preferably oscillates at 10 MHZ to enable counter 504 to operate with a resolution of approximately 10 nanoseconds (ns). The timestamper 502 appends this thirty-two bit time stamp to each ATM cell received by the cell bandwidth determinator 402 in a packet created by packetizer 508. A packet stream 510 containing the packetized ATM cells is provided to the user cell counter 503.

FIG. 6 is a table illustrating the format of the packets in the packet stream 510. In the illustrative embodiment, the packets are 17 long (32-bit) words in length, and contain the 53 bytes of the encapsulated ATM cells 202 and 204 as shown.

A timestamp field 602 is located at word 14 of the packet to store a 32-bit timestamp value generated by the timestamper 501. As noted, this value indicates the time the encapsulated cell 202, 204 has been received by the cell bandwidth determinator 302. It should be understood that the timestamp field 602 may contain any number of bits appropriate for a given application, and may be located in any predetermined position in the encapsulating packet.

As noted, the user cell counter 503 counts the number of cells of a user-specified type which are received between the sequential arrival of the timestamped cells. In the illustrative ATM ABR application described herein, user cell bandwidth is determined. As noted, the user cells 204 have a known relationship with the time stamped RM cells 202 in that the user cells 204 are positioned between RM cells 202 in an ATM ABR cell stream 401. Specifically, the user cell counter 404 receives the packet stream 501 from the RM cell timestamper 501, counts the number of user cells 204 that occur between the timestamped RM cells 202, and adds the count to the packet for subsequent processing by the rate calculator 410.

More specifically, the user cell counter 404 includes a cell identifier 512 that identifies which type of cell is contained in each packet, a channel selector 522 that selects the packets containing cells for a desired virtual channel, a user cell stream processor 526 that counts the number of user cells 204 that occur between the successive timestamped RM cells 202 in the selected channel and, preferably, an RM cell packet filter 530 that forwards only the RM cell packets to the rate calculator 410.

The cell identifier 512 identifies the cells in accordance with the particular communications protocol. In the ATM ABR communications environment described herein, the cell identifier 512 includes a cell classifier 514 that classifies the ATM cells 202, 204 in accordance with the ATM operations and maintenance (OAM) functions as directed by the ITU-T 1.610 and represented by standardized Fn tags. This numbering scheme is associated with the hierarchical layered design of ATM, and identifies where the OAM information flows between the two points. In the ATM network environment, the OAM functions residing at the ATM network layer are referred to as F4 and F5 OAM functions. F5 OAM information flows between network elements performing VC functions while F4 OAM information flows between network elements performing VP functions.

The cell classifier 514 examines the contents of the ATM cell header to classify the cells. The header contents examined by the cell classifier 514 include the virtual path identifier (VPI) and virtual channel identifier (VCI), as well as the payload type indicator (PLI) and cell loss priority (CLP) fields. As is well-known in the art, these fields contain the necessary data to classify the cells in accordance with the ATM OAM functions ITU standard.

The cell type encoding scheme implemented in one embodiment of the cell identifier 512 is shown in FIG. 7A. The 4-bit cell type code is stored in a cell type field 604 as shown in FIG. 6. Generally, the cell classifier 514 classifies the packets as containing user cells 204, all other cells at the ATM layer associated with the selected network connection, and cells pertaining to other network layers. As noted, the cell bandwidth determinator may determine the cell bandwidth at any desired network connection. In one embodiment, the cell bandwidth determinator 302 determines the user cell bandwidth in a cell stream occurring on one or more virtual channels. Of particular importance in this embodiment are the F5 user cell class 702 which identifies user cells 204 and the non-user cell F5 classes 704 which identifies all other types of cells, including the RM cells 202. Alternatively, the cell bandwidth determinator 302 may determine the user cell bandwidth in an ATM virtual path (VP). In this embodiment, the F4 OAM information is pertinent. Here, any F5 class (classes 702 and 704) identify an F4 user cell class 701, while the F4 classes 703 identify all other types of cells occurring in the virtual path, including RM cells 202.

Preferably, the packets containing non-ATM layer cells are discarded by the cell classifier 514. The packets classified as containing user (class 701 (VP) or class 702 (VC)) and non-user (class 703 (VP) or class 704 (VC)) cells are passed to an RM-cell identifier 516 in a classified packet stream 518.

The RM-cell identifier 406 examines those packets in the classified packet stream 518 that are classified as containing non-user-cells to determine whether such cells are RM cells 202. To make this determination, the RM cell identifier 516 examines the 48 byte payload of the encapsulated ATM cell. In accordance with the ITU specifications, the first byte of the payload contains protocol identification information specifically pertaining to ATM ABR RM cell 202. As shown in FIG. 6, this first byte of the payload is byte 606, located at byte 0 of word 2 of the packet. The RM cell identifier 516 encodes an OAM type field 608 as shown in FIG. 6. Referring to FIG. 7B, the encoded 4-bit value stored in the OAM type field 608 includes an OAM type 708 identifying which cells are RM cells 202. All cells received by the RM cell identifier 516, after being examined, are passed to a channel selector 522 in an identified packet stream 520.

The selector 522 examines the VPI/VCI information contained in the cell header and selects only those packets from a selected channel or path to be passed to the user cell stream processor 526. The channel selector 522 receives an identification of the selected network connection through the graphical user interface 364, or it may be preprogrammed by the user 366 using the user program environment 362. The selected channel and path are stored in a 4-bit VP-SEL field 610 and VC-SEL field 612, respectively, as shown in FIG. 6.

In one preferred embodiment, the channel selector 522 includes multiple outputs, each associated with one channel to examine the transmission characteristics of more than one channel. In another embodiment, the cell includes several channel selectors 522, each receiving an input from the RM cell identifier 516. In either embodiment, the cell bandwidth detector 402 would not be required to include duplicative system components such as time stamper 406, cell classifier 516, for each channel processed by the cell bandwidth detector 407.

Upon receiving the selected packet stream 521 containing channel-specific ATM packets from the channel selector 522, the user cell stream processor 526 counts the number of packets identified as containing user cells 204 that are received between each sequential pair of RM cell-containing packets. The user cell stream processor 526 stores this value in a user cell count (UCC) field 614 in the packet encapsulating the trailing RM cell 202, as shown in FIG. 6. In one embodiment, the user field is a 16-bit field and the count is a modulo-$2^{16}$ counter. Other formats and number of bits may be used.

The user cell stream processor 526 generates a processed packet stream 528 containing RM cells 204 embedded in packets containing all the necessary information for the user cell bandwidth to be determined. Specifically, each packet in the processed packet stream 528 containing an RM cell 202 also includes information identifying the packet as containing the RM cell 202, a timestamp indicating the time the RM cell 202 was received by the cell bandwidth determinator 402, and the number of user cells 204 received on the selected channel in the time interval between receipt of successive RM cells 202.

The user cell stream processor 412 forwards processed packet stream 528, including both RM cells 202 and user cells 204, to an RM cell filter 530. In the embodiment wherein the RM cells 202 and user cells 204 are packetized, the RM cell filter 530 identifies and discards all packets containing user cells 204 since the packets containing RM cells 202 have all of the information pertaining to the user cell bandwidth included in them. The RM cell filter 530 forwards a stream 532 of encapsulated RM cell packets 202 to the rate calculator 410. Preferably, an RM event FIFO is used to store the RM cell records contained in the RM cell packet stream 532. In one preferred embodiment, the RM cell filter 530 compresses the RM cell packets into a smaller record to expedite processing and decrease the size of the FIFO.

Referring to FIG. 8, one embodiment of the RM event record generated by the user-cell counter 404 is illustrated. The RM event record includes a timestamp field 802 that contains the time the encapsulated cell was received, and a UCC field 804 that contains the counted number of user cells. A current cell rate field 806 includes the source node transmission rate extracted from the RM cell header.

The rate calculator 410 extracts the user cell count (UCC) and timestamp values from each RM event record in the RM packet stream 532. To determine the user cell bandwidth between successive RM cells, the rate calculator 410 implements the following calculation.

$$\text{User Cell Bandwidth} = \frac{UCC}{TS_1 - TS_2} = \frac{\text{cells}}{\text{sec}}$$

where UCC=number of counted user cells
  $TS_2$=timestamp of the second occurring RM cell
  $TS_1$=timestamp of the first occurring RM cell
As one skilled in the relevant art would find apparent, the value may be translated to bytes or bits per second.

According to one embodiment, the rate calculator 410 includes a microprocessor and a local memory (not shown) to store instructions and data necessary to perform operations in accordance with the present invention. It should be appreciated, however, that any combination of hardware, software, and/or firmware could alternatively be used to implement the process and functions performed by the rate calculator 410. It should be understood that the architectural relationship between the components shown in FIG. 5 may be varied. For example, the RM cell timestamper 501 may be interposed between the rate calculator 410 and the user cell counter 503.

FIG. 9 is a flowchart of one embodiment of the processes performed by the cell bandwidth determinator 402 of the present invention. As used herein, the occurrence of predetermined events define the adaptive timebase during which the bandwidth of target cells is determined. At step 902, the cell bandwidth determinator 402 determines the timebase during which the bandwidth of the target cells is to be determined. The timebase is the time interval between the occurrence of predetermined events. In the illustrative embodiment, the cell bandwidth determinator 402 timestamps the RM cells 202 in the ATM ABR cell stream received by the cell bandwidth determinator 402.

At step 904, the cell bandwidth determinator 402 counts the number of target cells that are received during the adaptive timebase. The cell bandwidth determinator 402 then determines the target cell bandwidth during the adaptive timebase at step 906 given the time interval and the counted number of received target cells.

In one preferred embodiment, the rate calculator 410 also analyzes the immediate cell bandwidth. For example, in one embodiment, the cell bandwidth determinator 402 retrieves any information relating to the transmission characteristics that are included in the most recently received RM cell 202 for analysis and comparison with the calculated user cell bandwidth. In this embodiment, the current cell rate field 806 contains the currently transmitted cell rate provided by the source node 102. The cell bandwidth determinator 402 may compare the current cell rate with the calculated user cell bandwidth to identify any disparity between the two values. Such disparities are, as noted, protocol violations, and may be used to identify problems in the selected network connection. Such a protocol violation may then be provided to the channel monitor 304 for further analysis, error logging and statistical analysis. It should be understood that numerous other measurements and comparisons may also be performed by the bandwidth determinator 402 of the present invention on the information included in each RM cell 202 and encompassing packet. For example, the bandwidth of the RM cells 202 may also be calculated with the results of this calculation being compared with information including in the forward-going RM cells to identify protocol violations.

In the illustrative embodiment, the rate calculator 405 provides the results of its calculations and comparisons to the channel monitor 304 via bus 370. The channel monitor 304 preferably receives information on a per-channel basis from the cell bandwidth determinator 302. The information logged by the channel monitor 304 then is accessible by the graphical user interface 364 and user programming environment 362, and these devices can analyze and/or display the information to the user 366. The information logged by the channel monitor 304 include an indication of when the observed cell rate is greater than the current rate as encoded in the forward-going RM-cell, and when the observed cell rate is greater than a PCR event. The reader is referred to the *Traffic Management Specification Version* 4.0 and the article by Jain, Raj, et al., referred to above, for a further explanation of additional measurements and definitions of the acronyms used therein.

While various embodiments of the present invention have been described above, it should be understood that they have been presented by way of example only, and not limitation. It should be appreciated that while the present invention has been described in the context of an ATM protocol testing device that is used to emulate and evaluate the transmission characteristics of an ABR service provider, the invention is not limited to such a context. Rather, the ABR service category is used only as an example of a digital communications network in which bandwidths may be estimated according to an embodiment of the invention, and the ATM protocol testing device is used only as an example of a device that could implement such an embodiment. It should also be understood that the events upon which the adaptive timebase of the present invention is determined are the same, and are of the same type of event as that which is being measured; that is, cells. However, the events defining the adaptive timebase may be any desire event. For example, if the implementing device is a bus monitor, the starting event may be the occurrence of one or more occurrences constituting an error condition. The adaptive timebase during which the determinator of the present invention may then determine the cell bandwidth may continue from the occurrence of the error condition to the occurrence of another or same event. For example, the bandwidth may be determined during the time interval between the occurrence of two error conditions. Alternatively, the cell bandwidth may be determined during some fixed time interval after the occurrence of the initial error condition. Other condition internal or external may also be the identified event for delineating the adaptive timebase of the present invention. Also, in alternative embodiments, information may be transferred between components of the determinator 302 using any well known technique other than through fields of a packet containing the received cells. For example, timestamp and user count information may be provided to the rate calculator 410 via an internal bus, the setting of software variables or predetermined shared memory locations. Thus, the breadth and the scope of the present invention are not limited by any of the above exemplary embodiments, but are defined only in accordance with the following claims and their equivalents.

What is claimed is:

1. An event-based cell bandwidth determinator constructed and arranged to determine a transmission rate of a first type of cell in a cell stream occurring over a connection in a digital communications network during a time interval between an occurrence of a first predetermined event and an occurrence of a second predetermined event, the determinator comprising:

a timestamper adapted to be coupled to the digital communications network so as to receive the cell stream, the timestamper recording a first time at which the first predetermined event occurs and a second time subsequent to the first time at which the second predetermined event occurs;

a cell counter configured to count the number of the first type of cells occurring in the cell stream during the time interval; and a rate calculator coupled to the timestamper and to the cell counter, configured to divide the time interval into the number of the first type of cells to generate the transmission rate of the first type of cells.

2. A determinator as in claim 1, wherein the first and second predetermined events are successive occurrences of a second type of cell in the cell stream, and wherein one or more of the first type of cells occurs in the cell stream between the first and second occurrences of the second type of cell.

3. A determinator as in claim 1, wherein the first predetermined event is an occurrence of a predetermined condition and the second predetermined event is an occurrence of another predetermined condition.

4. A determinator as in claim 1, wherein the cell stream is an asynchronous transfer mode (ATM) available bit rate (ABR) cell stream, and wherein the first type of cell is an ATM ABR user cell and the second type of cell is an ATM ABR resource management (RM) cell.

5. A determinator as in claim 1, wherein the first predetermined event is receipt of a second type of cell in the cell stream and the second predetermined event is a next successive receipt of the second type of cell in the cell stream, and wherein the timestamper comprises:

a timestamp circuit that determines the time of receipt of each of the second type of cells in the cell stream; and a packetizer circuit, coupled to the timestamp circuit, configured to encompass the second type of cells into a packet and to store in a first field of each packet the time of receipt of any first and second types of cells encompassed within the packet.

6. A determinator as in claim 5, wherein each cell includes a payload and a header containing control information, and the cell counter comprises:

a cell identifier circuit configured to identify the first and second types of cells contained in each packet in accordance with an implemented communications protocol and to store a value indicating the cell type in a second predetermined field of the packet;

a channel selector circuit configured to select packets containing the second type of cells for the connection; and a cell stream processor that counts a number of first type of cells that are received over the connection during the time interval and stores that number in a third predetermined field in the packet.

7. A determinator as in claim 5, wherein the packetizer circuit also encompasses the first type of cells into a packet, and wherein the counter further comprises a packet filter circuit coupled to the cell stream processor, the packet filter circuit forwarding only packets containing the second type of cell to the rate calculator.

8. A determinator as in claim 1, wherein the connection comprises one or more channels in the digital communications network.

9. A determinator as in claim 1, wherein the connection comprises a virtual path in an ATM digital communications network.

10. An apparatus for determining a transmission rate of a first type of cell transmitted in a cell stream over a connection in an asynchronous transfer mode (ATM) network during an event-based adaptive time period, the apparatus comprising:

a processor;

a memory, coupled to the processor, having a plurality of instructions stored therein, which instructions when executed by the processor cause the processor to calculate an actual transmission rate of the first type of ATM cells received from the connection on the network during a time period between an occurrence of first and second predetermined events, the first and second predetermined events being receipt times of two ATM cells of a second type;

a cell bus interface device including a timestamper configured to identify receipt times of the second type of ATM cells received over the connection of the network; and a cell counter, configured to count the number of first type of ATM cells received from the connection of the network during the time period between the receipt times of the second type of ATM cells.

11. Apparatus as in claim 10, wherein:

the ATM cell stream is transmitted in accordance with an ATM Available Bit Rate (ABR) protocol, the second type of ATM cells are ABR Resource Management (RM) cells, and the first type of ATM cells are ABR user cells.

12. A protocol testing device comprising apparatus as set forth in claim 10.

13. Apparatus as in claim 10, wherein the cell bus interface is embodied in one or more programmable gate arrays.

14. A method for determining a transmission rate of a first type of cell transmitted in a cell stream over an asynchronous transfer mode (ATM) network connection during an event-based adaptive time period, the method comprising the steps of:

a) sensing the occurrence of a first predetermined event;

b) sensing the occurrence of a second predetermined event;

c) measuring a time period between the occurrences of the first and second events;

d) counting a number of cells received from the network connection during the time period; and e) calculating an actual transmission rate of the cells during the time period.

15. A method as in claim 14, further comprising the steps of:

f) determining, prior to step a), the first predetermined event upon which the transmission rate is to be measured; and g) determining, prior to step b), the second predetermined event upon which the transmission rate measurement is to be measured.

16. A method as in claim 14, wherein step (e) comprises dividing the number of cells counted at step (d) by the time period measured at step (c).

17. A method as in claim 14 wherein the method is performed by a protocol testing device coupled to the network.

18. A method as in claim 14 wherein step (a) comprises sensing an occurrence of a second type of cell in the cell stream and step (b) comprises sensing a subsequent occurrence of the second type of cell in the cell stream.

19. A method as in claim 18 wherein:

the cell stream is an asynchronous transfer mode (ATM) available bit rate (ABR) cell stream, the first type of cell is an ATM ABR user cell, and the second type of cell is an ATM ABR resource management (RM) cell.

20. An apparatus for determining a transmission rate of a first type of cell transmitted in a cell stream over an asynchronous transfer mode (ATM) network connection during an event-based adaptive time period, the apparatus comprising:

a sensor for sensing the occurrence of first and second predetermined events;

time period circuitry coupled to the sensor for measuring a time period between the occurrences of the first and second events;

a counter coupled to the network connection and the time period circuitry for counting a number of cells received from the network connection during the time period provided by the time period circuitry; and a transmission rate calculator coupled to the counter and the time period circuitry for calculating an actual transmission rate of the cells during the time period.

* * * * *